United States Patent
Kaminow

[15] 3,647,277
[45] Mar. 7, 1972

[54] INDUCTION HEATED OPTICAL GUIDE

[72] Inventor: Ivan P. Kaminow, New Shrewsbury, N.J.
[73] Assignee: Bell Telephone Laboratories, Incorporated, Murray Hill, Berkeley Heights, N.J.
[22] Filed: Oct. 30, 1969
[21] Appl. No.: 872,630

[52] U.S. Cl. .................. 350/96 R, 350/96 WG, 350/175 GN
[51] Int. Cl. .......................................................... G02b 5/14
[58] Field of Search ......... 350/96 R, 96 WG, 175 GN, 160 R; 331/94.5

[56] References Cited
UNITED STATES PATENTS
2,692,950  10/1954  Wallace .............................. 350/160 X

OTHER PUBLICATIONS

Carman et al., Article in Applied Physics Letters, Vol. 14 No. 4, Feb. 15, 1969, pgs. 136–139

*Primary Examiner*—David H. Rubin
*Attorney*—R. J. Guenther and Arthur J. Torsiglieri

[57] ABSTRACT

The disclosed optical guiding system employs radial thermal gradients in a propagation medium which is a bulk solid dielectric having a positive temperature coefficient of index of refraction and in which the radial thermal gradient is established by inductive heating of the rod, while inherent or forced cooling of the rod exterior establishes an approximately quadratic radial variation of index of refraction.

8 Claims, 2 Drawing Figures

| MATERIAL | | $dn/dt \times 10^{-5}/°C$ |
|---|---|---|
| LEAD GLASS | | 1 |
| LITHIUM NIOBATE | | (FOR $n_e$), 4 ; (FOR $n_o$), 0.5 |
| BARIUM TITANATE | 20°C | (FOR $n_e$), 12 ; (FOR $n_o$), -2 |
| | 110°C | (FOR $n_e$), 100 ; (FOR $n_o$), -2 |
| FUSED SILICA | | 0.4 |
| GERMANIUM | | 30 |
| SILICON | | 16 |
| ZINC SELENIDE | | 5 |
| CER-VIT ® | | 0.9 |

INVENTOR
I. P. KAMINOW
BY
Wilford L. Wiener
ATTORNEY

INDUCTION HEATED OPTICAL GUIDE

BACKGROUND OF THE INVENTION

This invention relates to optical guiding apparatuses.

The term "optical" is used here in a broad sense encompassing the infrared, visible and ultraviolet regions of the spectrum.

Image transfer in an optically transparent medium from point to point has become the object of much study and experimental investigation because of its utility in certain types of optical communication, optical information storage, and medical applications. As an example of the latter proposed use, relatively inaccessible body organs could be viewed through a probe inserted into the body with a suitable source of illumination, provided the image could be efficiently transferred along the probe.

Many prior proposals of optical guiding apparatuses for the purpose of image transfer have involved flexible bundles of clad optical fibers. Guiding, in each fiber, is obtained by making the index of refraction of the cladding lower than the index of refraction of the core fiber; and each fiber transmits just one element of the image or, in other uses, just one transverse mode. Such fiber bundles are difficult to align for good image transfer and long bundles are expensive to make.

Recently, a graded index rod or thick fiber has been proposed which could replace an entire bundle of clad fibers for the purposes of optical guiding and image transfer. Continuous focusing of the transmitted light is achieved by an approximately quadratic transverse variation in the index of refraction of the form $$n(r) = n(0)(1 - \alpha^2 r^2) \quad (1)$$

where $n(r)$ is the index of refraction at the radial distance $r$ from the center of the rod, $n(0)$ is the index of refraction at the center, and $\alpha$ is a constant. An appreciable transverse variation of $n(r)$, i.e., an appreciable $\alpha$, is achieved by a transverse variation in the material composition of the rod. Because relatively large values of $\alpha$ can be achieved in such rods, relatively small radii of curvature are achievable in flexible rods of this type, as compared to the much larger permissible radii of curvature in a gaseous optical guiding apparatus.

Nevertheless, this transverse variation of composition appears to be difficult to achieve; and $\alpha$ is not adjustable in operation. In any event, suitable fabrication techniques are as yet not readily available.

SUMMARY OF THE INVENTION

I have recognized that improved optical guiding by continuous focusing can be achieved in a solid rod or fiber by inductively heating the volume of the rod while the surface is cooled by inherent radiation or convection, or by forced cooling. While surface cooling will usually be inherent to the system, it can be supplemented if desired. A predictable and adjustable transverse variation of index of refraction is readily achieved.

Advantageously, the focal length of such an inductively heated guiding device can be readily adjusted or varied by control of the inductive heating level or the surface cooling; and, therefore, this device is more versatile than the above-described apparatuses. For many uses, this versatility more than compensates for the power consumption involved.

More specifically, for continuous positive focusing, the bulk of such an inductively heated device should have a positive temperature coefficient of index of refraction.

BRIEF DESCRIPTION OF THE DRAWING

Further features and advantages of my invention will become apparent from the following detailed description, taken together with the drawing, in which.

DESCRIPTION OF ILLUSTRATIVE EMBODIMENT

Figures 1, 2:
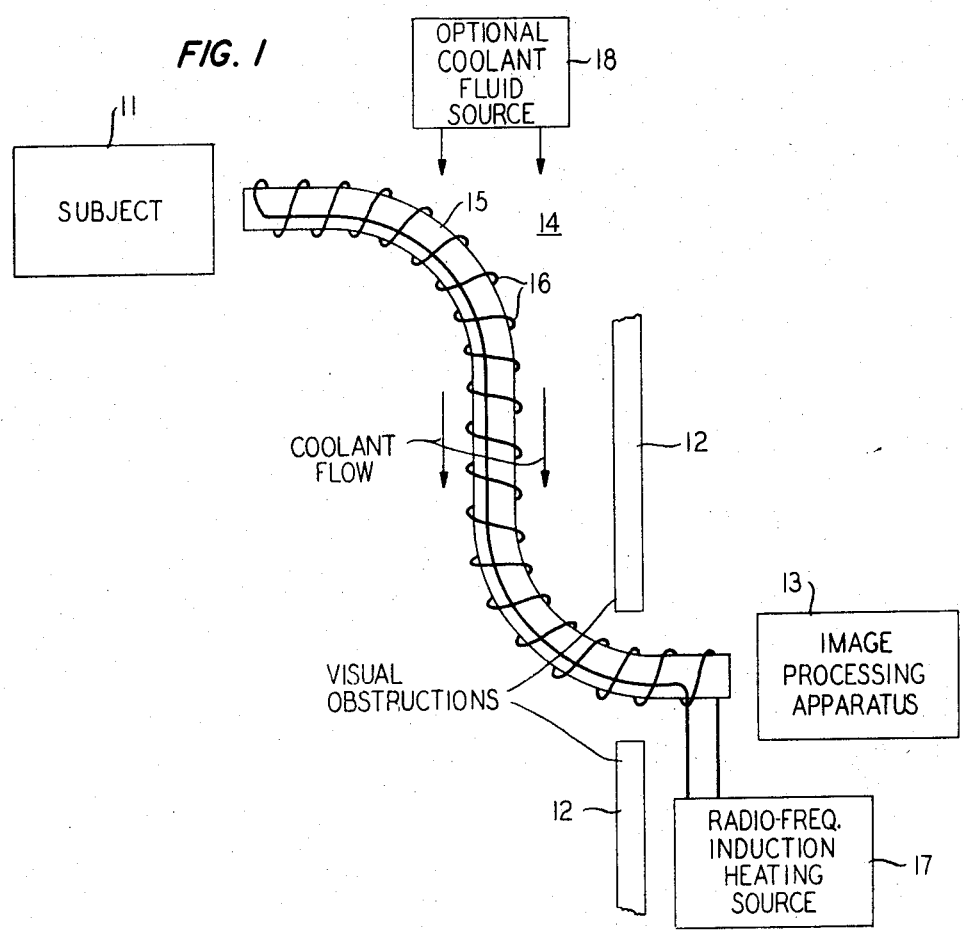
FIG. 1 is a partially pictorial and partially schematic illustration of a preferred embodiment of the invention.
FIG. 2 is a table of suitable optical materials together with pertinent parameters of their use in my invention.

It is proposed in the embodiment of FIG. 1 to optically examine an object 11 even though it is not readily accessible (as in the case of the lungs of a human being or an internal part of a machine) and is obscured by visual obstructions 12, e.g., adjacent parts. A clear image is to be obtained at an image processing apparatus 13, e.g., an image comparator or another human being, by means of an optical guiding apparatus 14 which can either be flexed or else pre-formed to circumvent the obstructions 12.

If illumination of object 11 is needed, it can be provided from the vicinity of apparatus 13 by a collimated light source (not shown) and a half-silvered mirror (not shown) between guiding apparatus 14 and processing apparatus 13, the mirror being oriented to direct the light into medium 15 of apparatus 14.

In accordance with my invention, the optical guiding apparatus 14 includes a transparent solid dielectric medium 15 having an elongated form with transverse dimensions appropriate for the size of image to be obtained and having a positive temperature coefficient, $dn/dT$, of index of refraction. Wrapped around the elongated medium 15 is an induction-heating coil 16, which is energized from an appropriate radiofrequency source 17.

An optional coolant source 18 can provide an optional forced coolant flow as indicated along medium 15. It will generally be preferable not to provide coolant flow if the part being observed and the obstructions are parts of the human body.

In a case such as the latter, the environment will be sufficiently cool that the surface of medium 15 is inherently cooled by radiant cooling, convection, or contact with the adjacent parts. For materials with large dn/dT, the temperature differential between the axis and the surface of the rod need only be a few degrees. In order to control ambient temperature (e.g., as is desirable in order to obtain large $dn/dT$ in $BaTiO_3$) it may be desirable to provide an auxiliary heater about apparatus 14 to increase the ambient temperature or to provide a flow of cryogenic liquid from source 18 in other cases in which it is desirable to decrease the ambient temperature. Ambient temperature determines the desired operating point; and then the inductive heating establishes the desired temperature differential with respect to ambient temperature.

Any of the materials listed in the table of FIG. 2 and other materials having positive $dn/dT$ are suitable for use as medium 15. Positive $dn/dT$ is most readily achieved in a material having low thermal expansion, so that electron density is not reduced as temperature increases. Thermal expansion reduces the electronic density and produces negative $dn/dT$. The actual achievement of positive $dn/dT$ also depends on a band edge shift toward lower energy with increasing temperature. All dielectric materials and semiconductive materials have a band edge, although, for the insulating dielectrics, it is in the ultraviolet. Not all have a shift of the band edge in the appropriate sense. One feasible amorphous semiconductive material not mentioned in the table of FIG. 2 and having an appropriate shift is arsenic trisulfide glass. The desired band edge shifts toward lower energy with increasing temperature are large in materials having second-order phase transitions, particularly in electro-optic materials. In such a case, the ambient temperature is preferably near the temperature of the second-order phase transition.

A phase transition is a temperature-dependent change in the atomic structure of the crystalline lattice. A second-order phase transition involves only continuous displacements of atoms with change in temperature.

The semiconductive materials useful for my invention may be called dielectric in the broadest sense, since they should have substantial resistivity and should be transparent at the transmitted wavelength.

Some clear ceramics, such as Cer-Vit, are specially made to have relatively low thermal expansion and thereby will have positive dn/dT if the band edge shifts toward lower energy with increasing temperature. Low-expansion ceramics illustratively are, and Cer-Vit in particular is, microcrystalline, polycrystalline silicate glasses containing metallic ions such as lithium and aluminum, in Cer-Vit and probably in others both as constituents of the crystalline lattice and also interspersed throughout spaces within the lattice. The interspersed ions are apparently present in solid solution.

Many suitable glasses, ceramics and plastics fall within the broad class of amorphous materials.

Sufficient power is supplied from source 17, for the particular medium 15 employed, that a radial temperature distribution is established in medium 15 of approximately the following form:

$$T(r)-T(o)=-p(z)/4k\, r^2 \qquad (2)$$

where $T(o)$ is the temperature on the axis of symmetry of medium 15, $T(r)$ is the lower temperature at radius $r$ away from that axis, $k$ is the thermal conductivity and $p(z$ is the power dissipated per unit volume at axial position $z$ due to dielectric loss, electrical conduction or magnetic loss at the frequency $\omega$ of the induction coil 16. All these effects contribute to the overall heating effect and, in view of the radiofrequency excitation, can be lumped together as providing the induction heating effect. It is preferred that $p(z)$ is substantially constant along the axis of the medium 15.

It should be noted that the aforementioned power dissipation effects need not be related to the optical losses. The typical values of the loss tangent, $\epsilon''/\epsilon'$, which is the ratio of the imaginary to the real part of dielectric constant, are $10^{-2}$ for $BaTiO_3$, $10^{-3}$ for glass and $10^{-4}$ for quartz at 1–100 MHz while $p(z) \approx <we''E^2$, with E being the radio-frequency electric field. Thus, if large $\epsilon'$, $\epsilon''/\epsilon'$ and $\omega$ are employed, only small fields E are needed for a given $p(z)$.

The medium 15 is selected to exhibit a positive rate-of-change, dn/dT, of index of refraction with temperature; and the quadratic radial variation of index of refraction (repeating Equation (1)), $$n(r)=n(o)(1-\alpha^2 r^2) \qquad (1)$$

is characterized by $$\alpha^2=(2/L)^2=p(z)/2k\, dn/dT \qquad (3)$$

where $L$ is the period of an off-axis ray oscillating about the axis of medium 15.

For single-mode waveguide application, as opposed to image transfer, the beam diameter $2w_o$ is related to $L$ by $$2w_o=2\sqrt{L\lambda/2\pi} \qquad (4)$$

where $\lambda$ is the optical wavelength. Naturally, in such an application, the radius, $a$, of cylindrical medium 15 must be greater than $w_o$ to contain the beam.

For the image applications mentioned above, for $N$ resolvable image elements, $a$ must be greater than $N.w_o$.

Then, the power dissipated per unit length of the medium 15 becomes $$P_l = \frac{4\pi 2kN\lambda}{(dn/dT)\cdot L}$$

The thermal conductivity of most dielectrics is approximately in the range from $1\times 10^3$ w./cm. °C. to $5\times 10^3$ w./cm. °C. and, as an example, is $4\times 10^3$ w./cm. °C. for lead glass. The thermal coefficients, $dn/dT$ can be as large as $100\times 10^{-5}/°$ C. with some examples listed in the table of FIG. 2. For lead glass, $dn/dT$ is $1\times 10^{-5}/°$ C.

If we take $L=1$ cm., corresponding to $2w_o=100\mu$ at $\lambda=1\mu$, $k=4\times^{-3}$ w./cm. °C. and $\sqrt{N}=1$, then $P_l=1.6$ w./cm. for $dn/dT=10^{-5}/°$C. (although it could be only 0.016 w./cm for a material for which $dn/dT$ was $100\times 10^{-5}/°$ C.).

This small value of L allows guiding around a short radius bend of comparable length and permits the use of a thin and relatively flexible, fiber of lead glass as medium 15 although at the expense of the stated power consumption and noticeable optical aberrations.

If we take $L=1$ meter then $2w_o=1$ mm. and $P_l=16$ mW/cm. for lead glass ($dn/dT=1\times10^{-5}/°$C.).

In order to transmit 100 resolvable picture elements, instead of a single mode, the powers indicated above must be increased by a like factor. This power consumption may be a small price to pay in many applications for the ability to vary $L$, or the effective focal length, resolution and the minimum bending radius just by varying the induction heating effect (or by varying the surface cooling effect, albeit by means not shown).

Various modifications of the apparatus are possible. For making observations in restricted areas, the induction coil 16 could be wrapped or coated directly onto the surface of medium 15. Various liquids or gases at various temperatures could be flowed past medium 15, as coolant. Corrections of chromatic aberration may be provided by including a dispersive section of medium 15 with negative dn/dT in analogy with standard lens practice. It is noted that negative dn/dT is most typically achieved as an incident of substantial thermal expansion, which reduces electron density.

It should be clear that in communication system applications of my invention, the problem to be solved by its use will not necessarily be visual obstructions. The reliability, the lack of multiple-lens-surface reflections, and the versatility of the invention as a guide over relatively great distances may be attractive. Therefore, straight sections of medium 15 are also of practical significance.

I claim:

1. A system for guiding a beam of electromagnetic wave energy by the formation of a radial thermal gradient across a transparent dielectric medium, comprising a homogeneous solid rod of said dielectric medium having a positive temperature coefficient of index of refraction, and means for forming said radial thermal gradient in said rod including inductive heating means surrounding said rod to heat the volume thereof substantially uniformly above ambient temperature whereby the surface of said rod inherently cools more rapidly toward ambient temperature than does the interior of said rod to provide a radially decreasing index of refraction therein.

2. A system for guiding a beam of electromagnetic wave energy by the formation of a radial thermal gradient across a transparent dielectric medium, comprising a homogeneous solid rod of said dielectric medium having a positive temperature coefficient of index of refraction, and means for forming said radial thermal gradient in said rod including inductive heating means surrounding said rod to heat the volume thereof substantially uniformly above ambient temperature and means for cooling the surface of said rod more rapidly than the interior of said rod toward ambient temperature to provide a radially decreasing index of refraction therein.

3. A system for guiding a beam of electromagnetic wave energy by the formation of a radial thermal gradient across a transparent dielectric medium, comprising an elongated substantially axially symmetrical body of said medium having positive temperature coefficient $dn/dT$, of index of refraction $n$, said medium being selected from the group consisting of lead glass, arsenic trisulfide glass, fused silica, lithium niobate, barium titanate, germanium, silicon, and zinc selenide, and means for forming said radial thermal gradient in said body including inductive heating means surrounding said body to heat the volume thereof substantially uniformly above ambient temperature whereby the surface of said body inherently cools more rapidly toward ambient temperature than does the interior of said body to provide a radially decreasing index of refraction therein.

4. A system according to claim 3 in which the medium is lead glass.

5. A system for guiding a beam of electromagnetic wave energy by the formation of a radial thermal gradient across a transparent dielectric medium, comprising an elongated substantially axially symmetrical body of said medium having positive temperature coefficient, $dn/dT$, of index of refraction $n$, said medium being selected from the group consisting of lead glass, arsenic trisulfide glass, fused silica, lithium niobate, barium titanate, germanium, silicon, and zinc selenide, and means for forming said radial thermal gradient in said body including inductive heating means surrounding said body to heat the volume thereof substantially uniformly above ambient temperature and means for cooling the surface of said body more rapidly than the interior of said body toward ambient temperature to provide a radially decreasing index of refraction therein.

6. A system according to claim 5 in which the medium is lead glass.

7. A system for guiding a beam of electromagnetic wave energy by the formation of a radial thermal gradient across a transparent dielectric medium, comprising an elongated substantially axially symmetrical body of a transparent silicate glass ceramic having a positive temperature coefficient, $dn/dT$, of index of refraction $n$, and means for forming said radial thermal gradient in said body including inductive heating means surrounding said body to heat the volume thereof substantially uniformly above ambient temperature whereby the surface of said body inherently cools more rapidly toward ambient temperature than does the interior of said body to provide a radially decreasing index of refraction therein.

8. A system for guiding a beam of electromagnetic wave energy by the formation of a radial thermal gradient across a transparent dielectric medium, comprising an elongated substantially axially symmetrical body of a transparent silicate glass ceramic having a positive temperature coefficient, $dn/dT$, of index of refraction $n$, and means for forming said radial thermal gradient in said body including inductive heating means surrounding said body to heat the volume thereof substantially uniformly above ambient temperature and means for cooling the surface of said body more rapidly than the interior of said body toward ambient temperature to provide a radially decreasing index of refraction therein.

* * * * *